United States Patent
Rioux et al.

[11] Patent Number: 5,938,277
[45] Date of Patent: Aug. 17, 1999

[54] INFLATED BICYCLE SEAT

[76] Inventors: Jean-Pierre Rioux; Suzanne Goyette Rioux, both of 17275 Collins Ave. #201, N. Miami Beach, Fla. 33160

[21] Appl. No.: 09/074,085

[22] Filed: May 7, 1998

[51] Int. Cl.[6] ........................................... B62J 1/26
[52] U.S. Cl. ...................... 297/199; 297/214; 297/195.1
[58] Field of Search .................................. 297/199, 214, 297/195.1

[56] References Cited

U.S. PATENT DOCUMENTS

| 5,330,249 | 7/1994 | Weber et al. | 297/199 X |
| 5,636,896 | 6/1997 | Howard | 297/199 |

FOREIGN PATENT DOCUMENTS

| 430802 | 8/1925 | Germany | 297/199 |
| 3001693 | 7/1981 | Germany | 297/199 |
| 412583 | 1/1946 | Italy | 297/199 |
| 191718 | 6/1937 | Switzerland | 297/199 |
| 20032 | 8/1897 | United Kingdom | 297/199 |
| 323707 | 1/1930 | United Kingdom | 297/199 |

*Primary Examiner*—Laurie K. Cranmer

[57] ABSTRACT

A new inflated bicycle seat for providing a pneumatic pad for a bicycle seat. The inventive device includes an inflatable bladder with a valve into the interior of the bladder. The bladder is restable on the top of a seat. A cover covers the bladder and the seat the bladder is rested on.

1 Claim, 4 Drawing Sheets

INFLATED BICYCLE SEAT

BACKGROUND OF THE INVENTION

1. Field of the Invention

The present invention relates to bicycle seats and saddles and more particularly pertains to a new inflated bicycle seat for providing a pneumatic pad for a bicycle seat.

2. Description of the Prior Art

The use of bicycle seats and saddles is known in the prior art. More specifically, bicycle seats and saddles heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle seats and saddles include U.S. Pat. No. 5,244,251; U.S. Pat. No. 5,330,249; U.S. Pat. No. 4,611,851; U.S. Pat. No. 5,318,344; U.S. Pat. No. 5,419,612; and U.S. Pat. No. Des. 286,346.

While these devices fulfill their respective, particular objectives and requirements, the aforementioned patents do not disclose a new inflated bicycle seat. The inventive device includes an inflatable bladder with a valve into the interior of the bladder. The bladder is restable on the top of a seat. A cover covers the bladder and the seat the bladder is rested on.

In these respects, the inflated bicycle seat according to the present invention substantially departs from the conventional concepts and designs of the prior art, and in so doing provides an apparatus primarily developed for the purpose of providing a pneumatic pad for a bicycle seat.

SUMMARY OF THE INVENTION

In view of the foregoing disadvantages inherent in the known types of bicycle seats and saddles now present in the prior art, the present invention provides a new inflated bicycle seat construction wherein the same can be utilized for providing a pneumatic pad for a bicycle seat.

The general purpose of the present invention, which will be described subsequently in greater detail, is to provide a new inflated bicycle seat apparatus and method which has many of the advantages of the bicycle seats and saddles mentioned heretofore and many novel features that result in a new inflated bicycle seat which is not anticipated, rendered obvious, suggested, or even implied by any of the prior art bicycle seats and saddles, either alone or in any combination thereof.

To attain this, the present invention generally comprises an inflatable bladder with a valve into the interior of the bladder. The bladder is restable on the top of a seat. A cover covers the bladder and the seat the bladder is rested on.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new inflated bicycle seat apparatus and method which has many of the advantages of the bicycle seats and saddles mentioned heretofore and many novel features that result in a new inflated bicycle seat which is not anticipated, rendered obvious, suggested, or even implied by any of the prior art bicycle seats and saddles, either alone or in any combination thereof.

It is another object of the present invention to provide a new inflated bicycle seat which may be easily and efficiently manufactured and marketed.

It is a further object of the present invention to provide a new inflated bicycle seat which is of a durable and reliable construction.

An even further object of the present invention is to provide a new inflated bicycle seat which is susceptible of a low cost of manufacture with regard to both materials and labor, and which accordingly is then susceptible of low prices of sale to the consuming public, thereby making such inflated bicycle seat economically available to the buying public.

Still yet another object of the present invention is to provide a new inflated bicycle seat which provides in the apparatuses and methods of the prior art some of the advantages thereof, while simultaneously overcoming some of the disadvantages normally associated therewith.

Still another object of the present invention is to provide a new inflated bicycle seat for providing a pneumatic pad for a bicycle seat.

Yet another object of the present invention is to provide a new inflated bicycle seat which includes an inflatable bladder with a valve into the interior of the bladder. The bladder is restable on the top of a seat. A cover covers the bladder and the seat the bladder is rested on.

Still yet another object of the present invention is to provide a new inflated bicycle seat that molds itself to match the contours of a person sitting on it.

Even still another object of the present invention is to provide a new inflated bicycle seat that is especially useful on hard bicycle seats to provide a comfortable pad thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
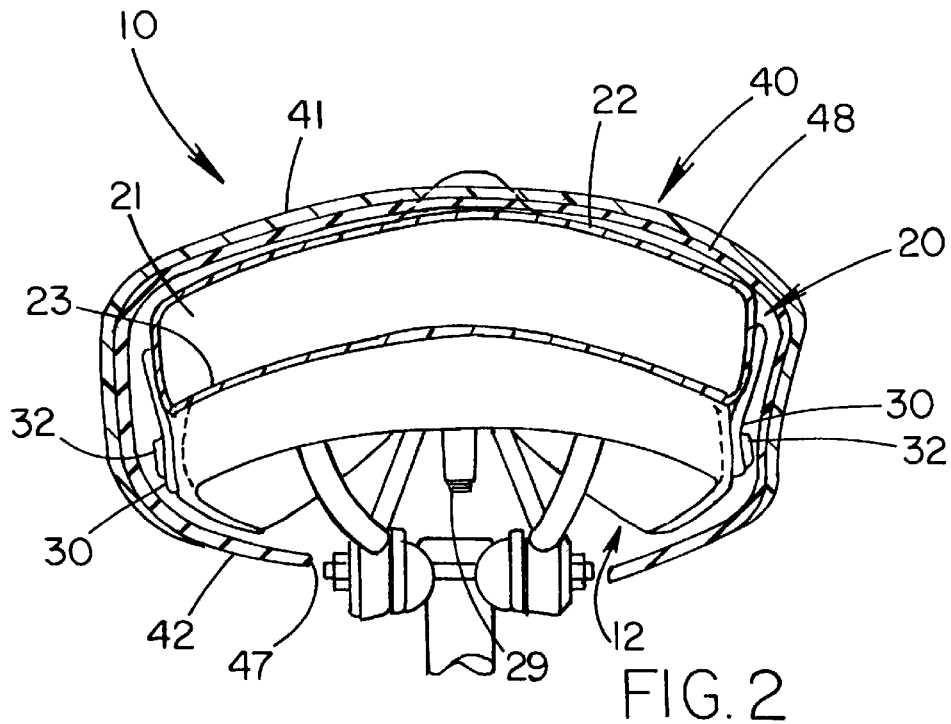
FIG. 2 is a schematic cross sectional view of the present invention.
Figure 1:
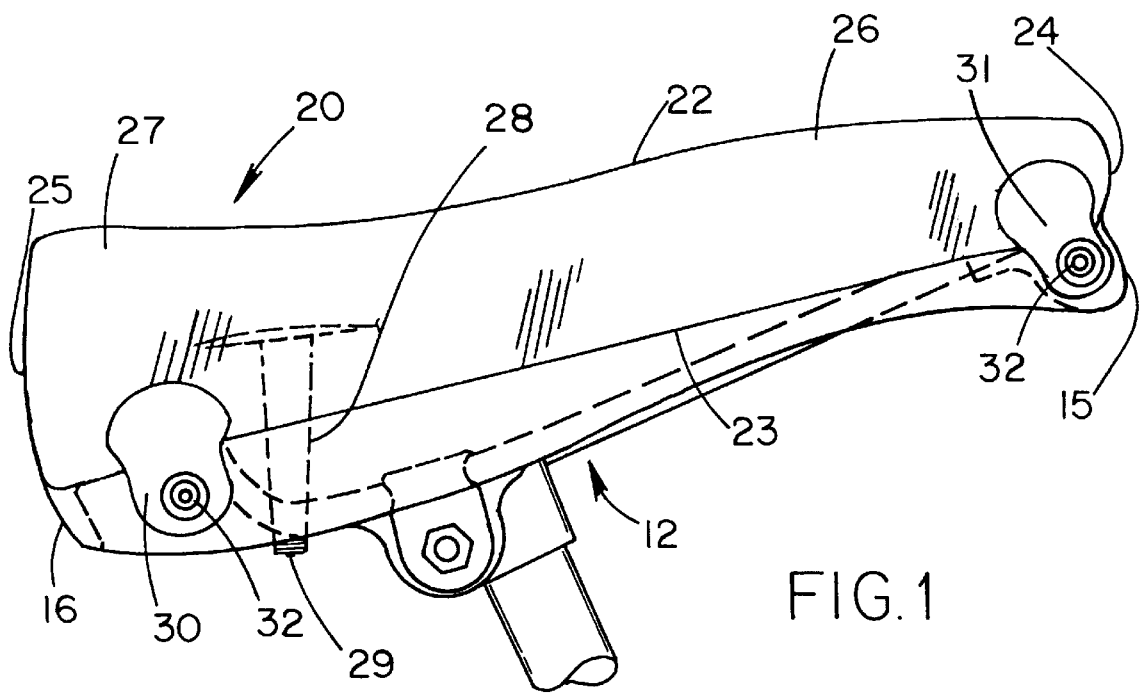
FIG. 1 is a schematic side view of the bladder and seat of a new inflated bicycle seat according to the present invention.
Figure 3:
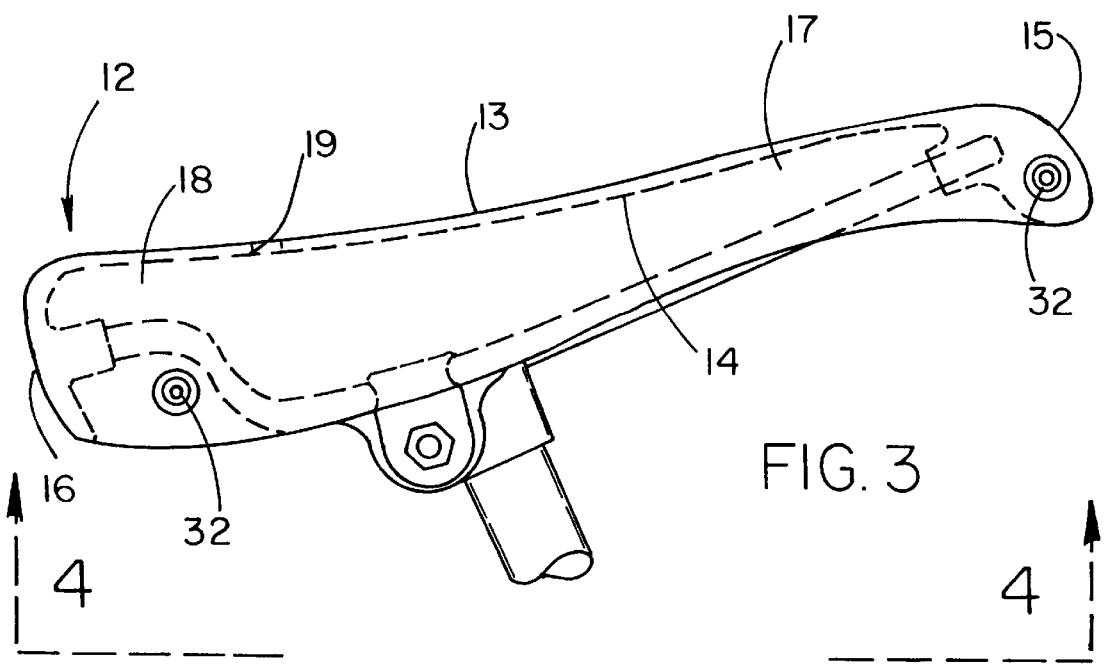
FIG. 3 is a schematic side view of the seat of the present invention.
Figure 4:
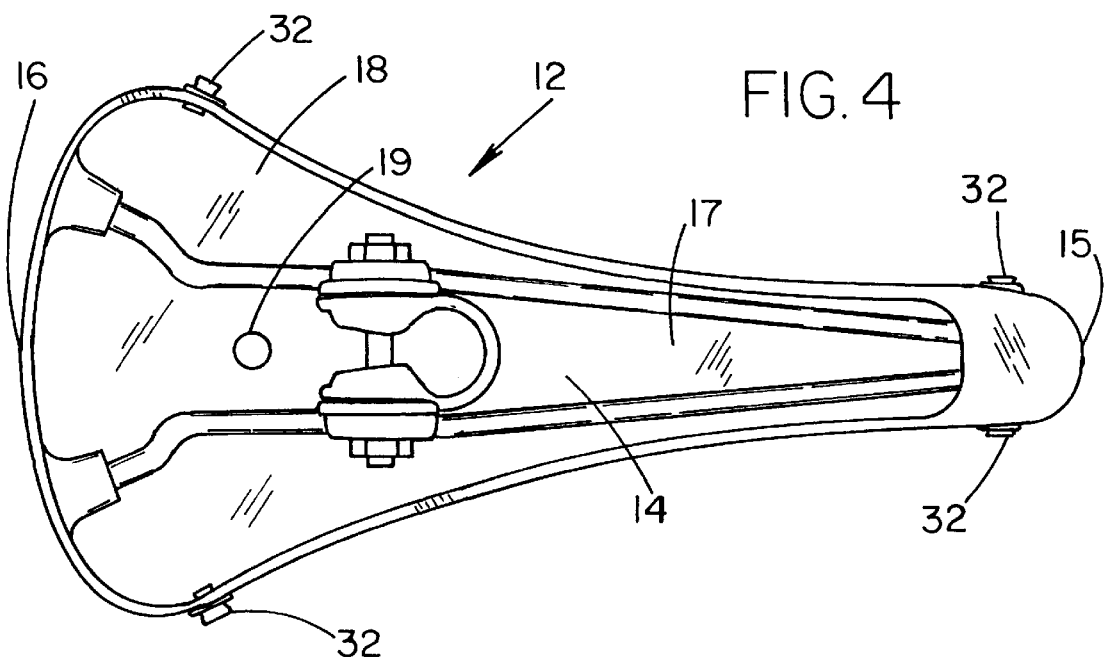
FIG. 4 is a schematic bottom side view of the seat of the present invention.
Figure 5:
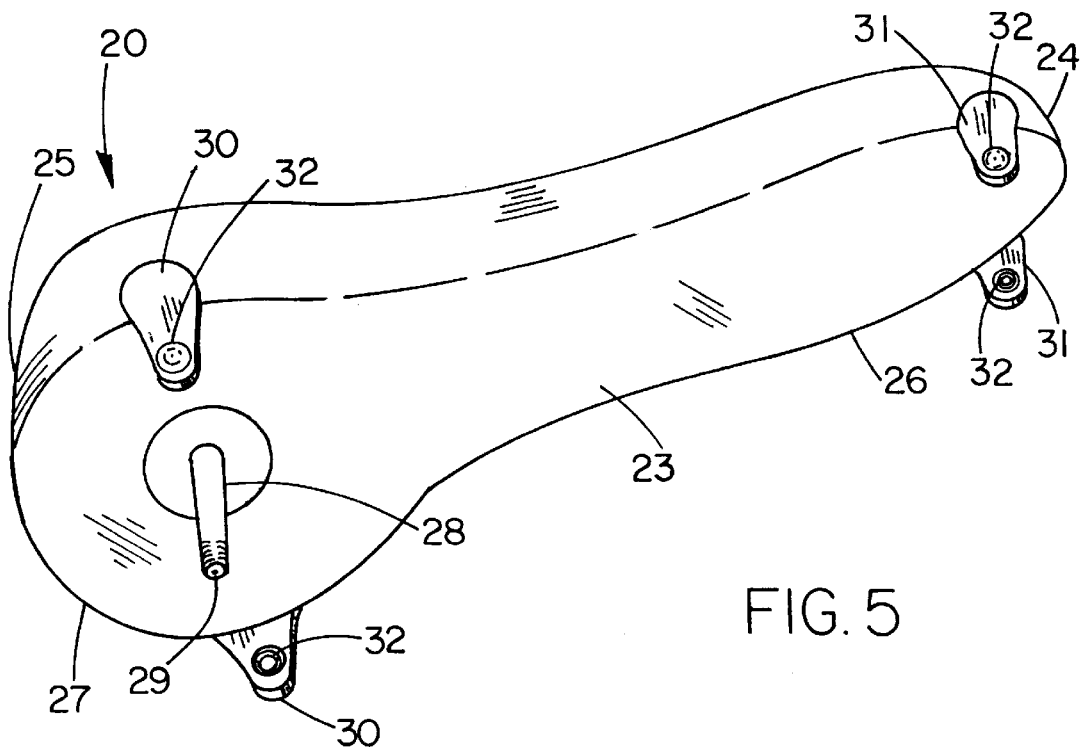
FIG. 5 is a schematic bottom perspective view of the bladder of the present invention.
Figure 6:
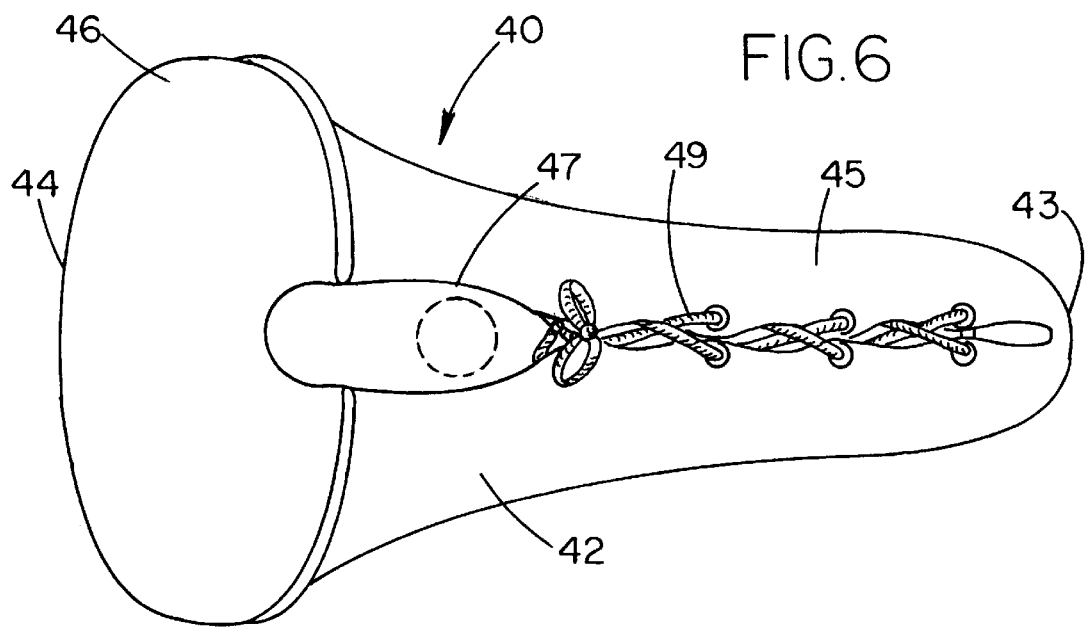
FIG. 6 is a schematic bottom side view of the cover of the present invention.
Figure 7:
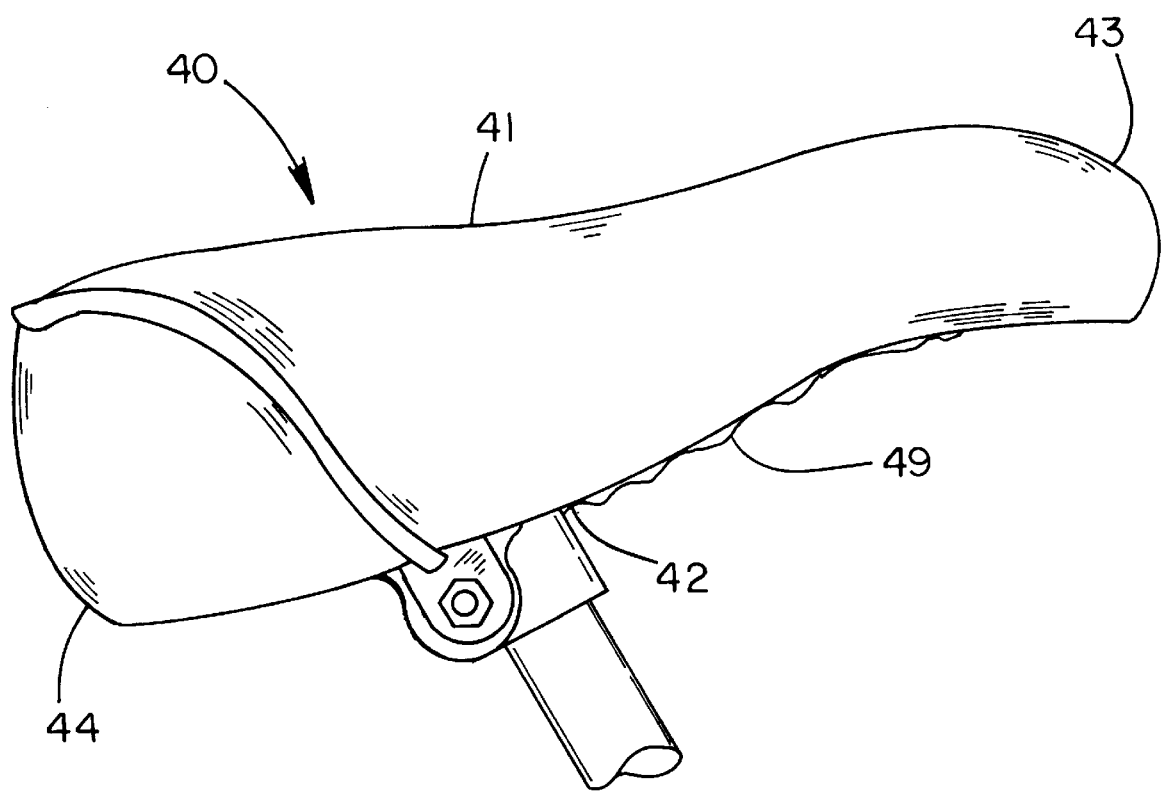
FIG. 7 is a schematic side view of the cover of the present invention.

With reference now to the drawings, and in particular to FIGS. 1 through 7 thereof, a new inflated bicycle seat embodying the principles and concepts of the present invention and generally designated by the reference numeral 10 will be described.

As best illustrated in FIGS. 1 through 7, the inflated bicycle seat 10 generally comprises an inflatable bladder 21 with a valve 29 into the interior 21 of the bladder 21. The bladder 21 is restable on the top 13 of a seat 12. A cover 40 covers the bladder 21 and the seat 12 the bladder 21 is rested on.

In closer detail, the padding attachment 10 is designed for a bicycle seat 12 having a top 13, a bottom 14, a front 15, a back 16, and horn and rear portions 17,18. The top 13 of the seat 12 has a hole 19 through it located behind the seat post.

The inflatable bladder 20 is shaped to match the outer upper contour of the bicycle seat 12 and has an interior 21, a top 22, a bottom 23, a front 24, a back 25, and horn and rear portions 26,27. The horn portion 26 of the bladder 21 is located towards the front 24 of the bladder 21 and the rear portion 18 of the bladder 21 is located towards the back 25 of the bladder 21. The bottom 23 of the bladder 21 has a stem 28 outwardly extending from it. The stem 28 has a valve 29 providing an opening into the interior 21 of the bladder 21. The bottom 23 of the bladder 21 is restable on the top 13 of a bicycle seat 12 such that the front 24 of the bladder 21 is positioned adjacent the front 15 of the bicycle seat 12 and such that the back 25 of the bladder 21 is positioned adjacent the back 16 of the bicycle seat 12. When the bottom of the bladder 21 is rested on the top of the bicycle seat 12, the stem 28 of the bottom of the bladder 21 is insertable through a hole 19 of a top 13 of a bicycle seat 12 such that the stem 28 extends from the bottom 14 of the bicycle seat 12. Ideally, the bladder 21 comprises pure gum rubber because this material is very resistant to rupture when a user sits on the bladder 21 and is easily conformable to the buttocks of a user sitting on the bladder 21.

The bladder 21 has first and second pairs of flaps 30,31. The first pair of flaps 30 is located on the rear portion 27 of the bladder 21 towards the back 25 of the bladder 21 and extending downwards away from the bottom 23 of the bladder 21. The second pair of flaps 31 is located on the horn portion 26 of the bladder 21 towards the front 24 of the bladder 21 and extending downwards away from the bottom of the bladder 21. The first and second pairs of flaps 30,31 are attachable to the bicycle seat 12 when the bladder 21 is rested thereon. Ideally, fasteners, such as snaps 32, permit attachment of the first and second pairs of the flaps 30,31 to the bicycle seat 12 with a portion of each snap provided on the bicycle seat 12 and a complementary portion provided on the associated flap.

The cover 40 has a top 41, a bottom 42, a front 43, a back 44, and horn and rear portions 45,46. The bottom 42 of the cover 40 has an opening 47. The cover 40 is adapted for covering the bladder 21 and a bicycle seat 12 such that the bottom opening 47 exposes the bottom 14 of the bicycle seat 12. Preferably, the cover 40 has a padded layer 48 provided on the inside of the top 41 and sides of the cover 40. Ideally, the padded layer 48 comprises a foamed material, although alternatively it may be comprised of a gel material. Preferably, the padded layer 48 is separable from the cover 40 for easy and convenient removal for replacement and cleaning. A portion of the opening 47 of the bottom 42 of the cover 40 is closable when covering the bladder 21 and the seat 12. Preferably, this portion of the opening 47 is located at the horn portion 45 of the cover 40. Ideally, an elongate flexible lace 49 closes the portion of the opening 47 of the cover 40 although it should be understood that various types of fasteners, such as a hook and loop fastener, snaps 32, and pins for example, may be used to close the portion of the opening.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. In combination:

a seat of a bicycle having a top, a bottom, a front, a back, and horn and rear portions, the top of the seat having a hole therethrough behind a seat post connected to said seat;

a padding attachment comprising:
- an inflatable bladder being shaped to match an outer upper contour of the seat and having an interior, a pair of sides, a top, a bottom, a front, a back, and horn and rear portions;
- said inflatable bladder having a vertical cross-section with a uniform height between the top and the bottom thereof, wherein the top and the bottom of the inflatable bladder have similar radii of curvature;
- said horn portion of said bladder being located towards said front of said bladder, said rear portion of said bladder being located towards said back of said bladder, wherein the sides of the inflatable bladder remain in substantially vertical planes which are coextensive with sides of the seat;
- said bottom of said bladder having a stem outwardly extending therefrom, said stem of said bottom of said bladder having a valve providing an opening into said interior of said bladder;
- said stem extending downwardly past a bottom peripheral edge of the seat;
- said bottom of said bladder being rested on the top of a seat such that said front of said bladder is positioned adjacent the front of the seat and such that said back of said bladder is positioned adjacent the back of the seat;
- said stem of said bottom of said bladder being inserted through the hole of a top of the seat;
- wherein said bladder comprises gum rubber which is resistant to rupture;
- said bladder having first and second pairs of flaps, said first pair of flaps each having a first end mounted on a lower peripheral edge of said rear portion of said bladder towards said back of said bladder and a second end extending downwards away from said bottom of said bladder, said second pair of flaps each having a first end mounted on a lower peripheral edge of said horn portion of said bladder towards said front of said bladder and a second end extending downwards away from said bottom of said bladder, wherein the flaps each have a width which tapers from top to bottom;
- said first and second pairs of flaps being attached to the seat, wherein snaps attach said first and second pairs of said flaps to the seat;

a cover having a top, a bottom, a front, a back, and horn and rear portions, said bottom of said cover having an opening, said cover covering said bladder and the seat;

said cover having a padded layer, wherein said padded layer comprises a foamed material; and a front portion of said opening of said bottom of said cover being closed, wherein said front portion of said opening is located between said horn portion of said cover and the seat post, wherein an elongate flexible lace closes said front portion of said opening of said cover while leaving a rear portion open for passage of said seat post and said stem.

\* \* \* \* \*